Jan. 21, 1964  J. A. FAVRE ETAL  3,118,735
WATER ANALYSIS
Filed June 8, 1959
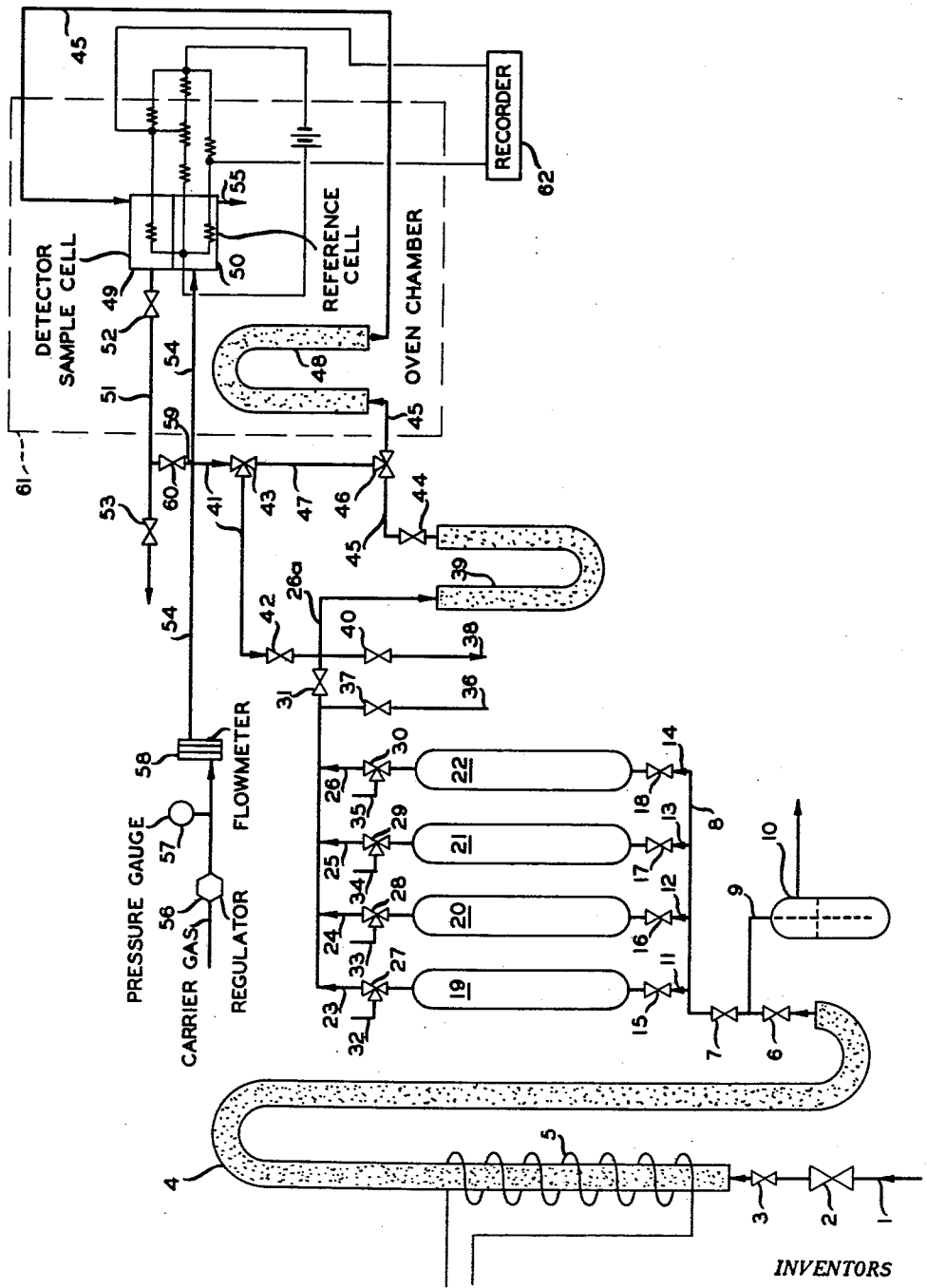
INVENTORS
J. A. FAVRE
D. E. SMITH
BY
*Hudson & Young*
ATTORNEYS 3,118,735
WATER ANALYSIS
John A. Favre and Dan E. Smith, Bartlesville, Okla., assignors to Phillips Petroleum Company, a corporation of Delaware
Filed June 8, 1959, Ser. No. 818,662
5 Claims. (Cl. 23—230)

This invention relates to the analysis of fluid streams to determine the concentration of water therein.

In various industrial and laboratory operations, there is a need for analysis procedures which are capable of measuring small concentrations of constituents in fluid mixtures. One analysis procedure which presently is becoming quite valuable for fluid analysis involves elution chromatography. In elution chromatography, a sample of the fluid mixture to be analyzed is introduced into a column which contains a material which selectively retards the passage therethrough of the constituents of the mixture. A carrier gas is directed into a column so as to force the sample through the column. The column packing material attempts to hold the constituents of the sample, whereas the stripping gas tends to pull them through the column. This results in the several constituents of the fluid mixture traveling through the column at different rates of speed, depending upon their affinities for the packing material. The column effluent thus consists initially of the carrier gas alone, the individual constituents of the fluid mixture appearing at later spaced time intervals. It is common practice to detect these constituents by means of a thermal conductivity analyzer which compares the thermal conductivity of the effluent gas with the thermal conductivity of the carrier gas directed to the column.

While analyzers of this type have proved to be quite valuable in the analysis of fluid mixtures, their use for analyzing water contained in a fluid mixture, especially very small amounts such as a few parts per million, is not practical, because the valves and fittings and other parts of the apparatus often contain enough adsorbed or absorbed water to completely mask the small amount of water contained in the sample.

Accordingly, it is an object of the invention to provide an improved and novel method of analysis of water in a fluid utilizing principles of chromatography.

Other objects, advantages and features of this invention, including arrangement of apparatus for effecting the method of the invention, should become apparent from a consideration of the specification and drawings.

In accordance with the present invention, a novel method is provided wherein a fluid stream containing minor proportions of water is contacted with a chemical reactive reagent which quantitatively converts the water present to another compound or element and the sample containing this constituent in place of the water, for instance hydrogen, is subjected to chromatographic analsis for said constituent, such as the hydrogen mentioned. The amount of hydrogen can then easily be converted to the amount of water originally present. Employing this method the presence of adsorbed water in the valves and other fittings of the equipment will not affect the accuracy of the chromatographic analysis made.

The principles of the invention will be more readily understood by reference to the following detailed description in conjunction with the accompanying drawing, which is a schematic representation of one arrangement of apparatus for effecting the method of the invention.

Referring now to the drawing in detail, 1 is a sample line from a plant producing a wet product stream, in this case, 1-butene, and line 1 conveys the wet 1-butene liquid plant stream to the analyzing apparatus. Line 1 is connected to heated expansion valve 2 which permits complete vaporization of the liquid into a vapor. Any means of completely vaporizing the sample is satisfactory. One such means is a heated vaporizer expansion valve as described in Patent 2,826,180 by D. E. Lupfer. Opening of valve 3 permits the vaporized material to pass into the reactor column 4.

The first portion of reactor column 4 is heated as indicated by the electrical resistance heater 5. The reactor column contains calcium hydride in particulate form, say 25 grams, for converting the small amount of water in the hydrocarbon vapor to hydrogen. The vapor flows through reactor column 4, in this example, at the rate of 30 milliliters per minute, during which time the water is converted to hydrogen by reaction with the calcium hydride. Other metal hydrides such as aluminum hydride, sodium hydride, lithium hydride, $LiAlH_4$, etc., which evolve hydrogen stoichiometrically from water can be used in lieu of calcium hydride in reactor column 4. The output from reactor column 4 passes through valves 6 and 7 to manifold 8. A connection is made by line 9 between valves 6 and 7 through a mercury bubbler 10, which is employed to maintain a constant pressure of the sample stream. Leading from manifold 8 are a plurality of lines 11, 12, 13 and 14 containing valves 15, 16, 17 and 18, respectively. The last-named valves are connected, respectively, to sample bulbs 19, 20, 21 and 22. Bulbs 19, 20, 21 and 22 are of a constant and known volume, in this instance each bulb being 250 milliliters. Although one sample bulb would suffice, a plurality of sample bulbs 19 through 22 are usually employed in order to always have a sample ready for analysis without waiting for purging of the sample bulb just employed. The sample bulbs are provided, respectively, with outlet lines 23, 24, 25 and 26 containing, respectively, 3-way valves 27, 28, 29 and 30 respectively. These lines connect with manifold line 26a containing valve 31. Vent lines 32, 33, 34 and 35 leading from the respective valves are also provided, as shown. A line 36 connects line 26a with the atmosphere, as shown, and contains valve 37. Line 26a joins the inlet of concentrator column 39, containing a sorbent material. Joining line 26a is a vacuum line 38 containing valve 40 and line 41 containing valve 42 and 3-way valve 43, as shown. At the outlet end of concentrator column 39 is valve 44 and valve 44 is joined to line 45 containing 3-way valve 46. Between 3-way valve 43 in line 41 and 3-way valve 46 in line 45 is a line 47. Concentrator column 39 in the particular example described is, for instance, one-fourth inch inside diameter and 12 inches long and contains a sorbent. The sorbent is a material which will concentrate the component to be analyzed by sorbing other components preferentially. In this example the sorbent used is a solid adsorbent known as a molecular sieve, of 20 to 35 mesh particle size, specifically a molecular sieve sold by Linde Air Products Co. as "Type 5A" molecular sieve. This material is a synthetic chabasite (zeolite) having pores of about 5 angstroms. The molecular sieve materials are natural or synthetic zeolites. Examples of other suitable molecular sieves include phacolite, gmelimite, harmotone, and the like, all of a rigid three dimensional structure. These materials are found naturally in three different forms, namely fibrous, laminous and rigid 3-dimensional anionic networks. It is only the three-dimensional network material which is useful as a molecular sieve. When it is desired to concentrate a material in concentrator 39 by adsorbing normal aliphatic hydrocarbons, a molecular sieve of approximately 5 angstroms diameter is especially useful, such a material being the chabasite group of minerals. These materials adsorb the normal hydrocarbons but not hydrogen. Other sorbent materials known in the chromatographic analysis art can, of course, be employed in a given case, the choice of material easily being made by one skilled in the art, depending upon the nature of the wet fluid to be analyzed.

Line 45 connects to the inlet of the detector sample cell 49 of dual thermal conductivity cell 49–50. Interposed in line 45 is chromatographic analyzer column 48. In this example the column is ¼ inch inside diameter and is 12 inches long. It contains an adsorbent material like that described with respect to concentrator column 39. Leading from detector sample cell 49 is outlet line 51 containing valves 52 and 53. The reference cell of the dual thermal conductivity cell is connected to inlet 54 and outlet to the atmosphere, 55. The other end of line 54 is connected to a source of carrier gas, also employed as a reference gas, in this example nitrogen, and line 54 contains regulator 56, pressure gauge 57 and flow meter 58, as shown. Line 41, already described, is connected to line 54 as shown. A cross-over line 59 containing valve 60 connects line 51 with line 54. The portion of the apparatus including the chromatographic analyzer column 48 and the dual thermal conductivity cell 49–50 is contained in an oven chamber 61 for maintaining a constant temperature. This chamber is indicated by the dotted lines. The detector 49–50 includes two thermal conductivity type detectors forming opposite legs of a Wheatstone bridge, as indicated in the drawing. This dual thermal conductivity cell in this instance is the same as that described and operates in the manner described in the ISA Journal for November of 1957 in the article on pages 514 through 517. The circuit is shown in FIGURE 7 therein. The circuit is generally indicated in the present drawing but the power supply in the present drawing is shown as a battery, for simplicity, and the 25 ohm variable resistance in one of the power supply lines and the 0–500 milliammeter in the same power supply line are also omitted for simplicity. Also, the null indicator is not shown on the present drawing. Although it is not shown in the figure, the output signal from the thermal conductivity detector can be fed to a data converter including a peak reader to adapt the present system to automatic process conrol as described in the ISA Journal for October 1958, pages 28–31.

The hydrocarbon containing hydrogen resulting from the reaction of the water vapor issues from reactor column 4 and passes through open valves 6 and 7 to manifold 8 and then in parallel through sample bulbs 19, 20, 21 and 22, valves 15, 16, 17, 18 being open and 3-way valves 27, 28, 29 and 30 being open to connect lines 23, 24, 25 and 26, respectively, with lines 32, 33, 34 and 35, respectively, so that the samples are vented to the atmosphere. When it is desired to run an analysis, one of the sample bulbs is closed off, say bulb 22, so that it is filled with a portion of the sample at a known pressure, usually about 0.5 inch of mercury above atmospheric. A sample is trapped in sample bulb 22 by closing 3-way valve 30 and then shortly thereafter closing valve 18. Meanwhile, concentrator column 39 has been back-purged and a vacuum created therein by the following procedure. Valves 40 and 42 are in closed position, while nitrogen flows through regulator 56, line 54, line 41, line 47, line 45, through concentrator column 39, line 26a and out line 36, valves 43, 46, 44, 31 and 37 being open and valve 60 being closed. Three-way valves 43 and 46 are open, of course, to connect lines 41 and 47 and to connect lines 47 and 45 on the side of valve 46 connecting line 45 with concentrator column 39. After purging in this manner valves 44 and 37 are closed and valve 40 is opened. A vacuum is pulled on concentrator 39 through line 38 which is connected to a vacuum source, not shown. The vacuum is pulled to a low absolute pressure, preferably 0.01 millimeter Hg maximum. Valve 40 is then closed. Three-way valve 30 is then positioned to connect line 26 with line 26a. The sample from 22 is thus drawn over into evacuated concentrator column 39. This usually takes about 1 minute in this size equipment, after which valve 31 is closed. Hydrocarbons are preferentially adsorbed in concentrator column 39, with hydrogen being driven ahead of the hydrocarbon and being trapped near valve 44. At this point 3-way valve 43 is positioned to connect line 41 with line 26a at the inlet end of concentrator 39, valve 42 also being open. A portion of the nitrogen gas which has been flowing through line 54 into the reference cell and out through line 55 flows through line 41, valve 43, valve 42 and into and through concentrator 39, valve 44 and 46 also being opened. Three-way valve 46 is at this time positioned to connect concentrator 39 with analyzer column 48 through line 45. It takes about 40 seconds to drive the hydrogen in concentrator column 39 from this column. At the end of such time valve 44 is closed and 3-way valves 43 and 46 are repositioned so that the flow is through line 41, valve 43, line 47, valve 46 and line 45 into and through analyzer column 48. After a short interval, the hydrogen peak appears and is detected in sample cell 49. This peak is recorded on recorder 62. The amplitude of this peak is calculated to show the per cent hydrogen, and this value can be converted to the water concentration.

After the foregoing cycle of concentration and analysis has been made, the concentrator column is back-purged with the nitrogen as before described. If desired, the analyzer column can also be back-flushed by flowing nitrogen from line 54 through line 59, valve 60 and into line 51 through the sample cell, valve 52 being open, and then through line 45 and the analyzer column 48. Ordinarily valve 60 is otherwise closed.

Instead of nitrogen there can be employed carbon dioxide or air as the carrier gas and the reference gas.

The method of the invention can be applied to any water content, but is, of course, particularly useful at low water contents where other methods are not applicable or are very inaccurate. The method finds its widest usefulness at water concentrations less than 100 parts per million by weight and is useful at concentrations less than 2 parts per million with a precision of less than 1 part per million, but at the same time the method is applicable to streams containing any higher water concentration.

The method of the invention finds particular application in determining the amount of water in hydrocarbons, such as paraffinic, olefinic, aromatic and cycloparaffinic hydrocarbons.

Instead of calcium hydride employed in the specific example, there can be employed metallic carbides which react stoichiometrically or quantitatively with water to evolve acetylene, and then the analysis by chromatographic methods can be an analysis of the acetylene. Examples of such metallic carbides include the carbides of the alkali metals, such as sodium, potassium, lithium, rubidium and cesium; carbides of copper, silver, gold, beryllium, magnesium, calcium, strontium, barium, zinc, cadmium, aluminum, yttrium, lanthanum, cerium, praseodymium, neodymium and $ThC_2$, $VC_2$ and $UC_2$.

Also, the chemical reactive reagent can be an organic isocyanate that reacts with water quantitatively to form $CO_2$, and the chromatographic analysis is then for the $CO_2$. Particularly useful are the hydrocarbon isocyanates such as phenyl isocyanate, ethyl isocyanate and the many other available hydrocarbon isocyanates including alkyl, aryl, alkenyl and cycloalkyl isocyanates.

While the invention has been described in connection with the drawing as including a concentrating step in a concentrator column 39, it will be understood that this column can be omitted when desired. Thus, both of the columns are actually concentrator columns, that is, columns 39 and 48, in that they allow the hydrogen to pass through the column in a concentrated form. The inclusion of concentrator column 39 merely serves to increase the sensitivity of the analysis somewhat. When concentrator column 39 is omitted, line 26a connects directly to line 45 and the section of line 41 between valve 43 and line 26a is omitted.

As will be evident to those skilled in the art, various modifications of this invention can be made or followed in the light of the foregoing disclosure and discussion without departing from the spirit or scope of the disclosure or from the scope of the claims.

What is claimed is:

1. A method for determining water content of a fluid containing said water in a minor proportion which comprises contacting said fluid in a first zone with a chemical reactive reagent which reacts with all of said water to produce a corresponding amount of another chemical entity selected from the group consisting of hydrogen, acetylene and carbon dioxide, passing the resulting effluent as a vapor from said first zone into the inlet of a second zone containing a material that selectively retards passage therethrough of the constituents of said effluent to thus permit said another chemical entity to pass from said second zone in a concentrated form, passing the effluent containing said another chemical entity in a concentrated form from said second zone to a third zone containing a material that selectively retards passage therethrough of the constituents of the effluent from said second zone to thus permit said another chemical entity to pass from said third zone in a more concentrated form, and measuring the thermal conductivity of the effluent containing said another chemical entity from said third zone which is representative of the water concentration of said fluid.

2. A method of claim 1 wherein said reagent is a metal hydride which reacts stoichiometrically with water to produce hydrogen, and said another chemical entity is molecular hydrogen.

3. A method of claim 1 wherein said reagent is a metal carbide which reacts stoichiometrically with water to produce acetylene, and said another chemical entity is acetylene.

4. A method of claim 1 wherein said reagent is an organic isocyanate which reacts stoichiometrically with water to produce carbon dioxide, and said another chemical entity is carbon dioxide.

5. A method of claim 1 wherein said fluid consists essentially of a wet hydrocarbon.

References Cited in the file of this patent

UNITED STATES PATENTS

| | | |
|---|---|---|
| 2,671,343 | Jacobs | Mar. 9, 1954 |
| 2,848,306 | Blumer | Aug. 19, 1958 |
| 2,866,690 | Coyne | Dec. 30, 1958 |
| 2,905,536 | Emmett | Sept. 22, 1959 |

FOREIGN PATENTS

| | | |
|---|---|---|
| 784,169 | Great Britain | Oct. 2, 1957 |

OTHER REFERENCES

Spracklen: ISA Journal, November 1957, p. 514–517.

UNITED STATES PATENT OFFICE
CERTIFICATE OF CORRECTION

Patent No. 3,118,735                      January 21, 1964

John A. Favre et al.

It is hereby certified that error appears in the above numbered patent requiring correction and that the said Letters Patent should read as corrected below.

Column 5, line 16, after "dioxide," insert -- said chemical reactive reagent selected from a group consisting of metal hydrides, metal carbides, and organic isocyanates, --.

Signed and sealed this 30th day of June 1964.

(SEAL)
Attest:

ERNEST W. SWIDER                      EDWARD J. BRENNER
Attesting Officer                      Commissioner of Patents